(12) United States Patent
Motley et al.

(10) Patent No.: US 9,786,206 B2
(45) Date of Patent: Oct. 10, 2017

(54) WATER RESISTANT AND STRETCHABLE STICKER

(71) Applicants: Cindy Marie Motley, San Clemente, CA (US); James Henry Motley, San Clemente, CA (US)

(72) Inventors: Cindy Marie Motley, San Clemente, CA (US); James Henry Motley, San Clemente, CA (US)

( * ) Notice: Subject to any disclaimer, the term of this patent is extended or adjusted under 35 U.S.C. 154(b) by 0 days.

(21) Appl. No.: 15/011,675

(22) Filed: Feb. 1, 2016

(65) Prior Publication Data

US 2016/0307471 A1    Oct. 20, 2016

Related U.S. Application Data

(60) Provisional application No. 62/110,895, filed on Feb. 2, 2015.

(51) Int. Cl.
*G09F 3/02* (2006.01)
*B32B 27/36* (2006.01)
(Continued)

(52) U.S. Cl.
CPC ............ *G09F 3/02* (2013.01); *B32B 5/024* (2013.01); *B32B 5/18* (2013.01); *B32B 5/245* (2013.01); *B32B 5/26* (2013.01); *B32B 7/06* (2013.01); *B32B 7/12* (2013.01); *B32B 2262/0207* (2013.01); *B32B 2262/0261* (2013.01); *B32B 2262/0276* (2013.01);
(Continued)

(58) Field of Classification Search
CPC ............ G09F 3/02; G09F 2003/023; G09F 2003/0233; G09F 2003/0236; G09F 2003/0257; G09F 2003/0282; B32B 25/14; B32B 27/36; B32B 5/024; B32B 5/18; B32B 5/245; B32B 5/26; B32B 7/06; B32B 7/12; B32B 2262/0207; B32B 2262/0261; B32B 2262/0276; B32B 2266/0207; B32B 2307/4026; B32B 2307/51; B32B 2307/546; B32B 2307/5825; B32B 2307/7265; B32B 2307/732; B32B 2307/748; B32B 2307/75; B32B 2405/00; B32B 2519/00; Y10T 428/14
See application file for complete search history.

(56) References Cited

U.S. PATENT DOCUMENTS 8,399,091 B2 *  3/2013  Yamamoto ............ C09J 7/0217
                                              428/343
2006/0063455 A1 *  3/2006  Murphy ................. B32B 5/022
                                              442/327
(Continued)

*Primary Examiner* — Patricia L Nordmeyer
(74) *Attorney, Agent, or Firm* — Mark R. Kendrick

(57) ABSTRACT

A water-resistant and stretchable sticker comprises a printable layer and a neoprene layer, the neoprene layer may be fused or melted to a printable layer. A water-resistant and stretchable sticker may also include a nylon fabric layer, the nylon fabric layer being attached to the neoprene-based layer. The printable layer comprises a nylon-based layer. The printable layer may comprise a polyester, double-knit jersey fabric layer. In embodiments, the water-resistant and stretchable layer further comprises an adhesive layer, the adhesive layer being adhered to the nylon fabric layer. In embodiments, the water-resistant and stretchable layer further comprises a peel-away layer being adhered to the adhesive layer.

10 Claims, 6 Drawing Sheets

(51) Int. Cl.
*B32B 25/14* (2006.01)
*B32B 5/02* (2006.01)
*B32B 5/18* (2006.01)
*B32B 5/24* (2006.01)
*B32B 5/26* (2006.01)
*B32B 7/06* (2006.01)
*B32B 7/12* (2006.01)

(52) U.S. Cl.
CPC ......... *B32B 2266/0207* (2013.01); *B32B 2307/4026* (2013.01); *B32B 2307/51* (2013.01); *B32B 2307/546* (2013.01); *B32B 2307/5825* (2013.01); *B32B 2307/7265* (2013.01); *B32B 2307/732* (2013.01); *B32B 2307/748* (2013.01); *B32B 2307/75* (2013.01); *B32B 2405/00* (2013.01); *B32B 2519/00* (2013.01); *G09F 2003/023* (2013.01); *G09F 2003/0233* (2013.01); *G09F 2003/0236* (2013.01); *G09F 2003/0257* (2013.01); *G09F 2003/0282* (2013.01)

(56) References Cited

U.S. PATENT DOCUMENTS

2012/0288662 A1* 11/2012 Conolly ............... A43B 1/0045
  428/87
2014/0079900 A1* 3/2014 Ramirez ............ A61F 13/0246
  428/41.8
2015/0247066 A1* 9/2015 Ramirez ............ A61F 13/0246
  602/1

* cited by examiner

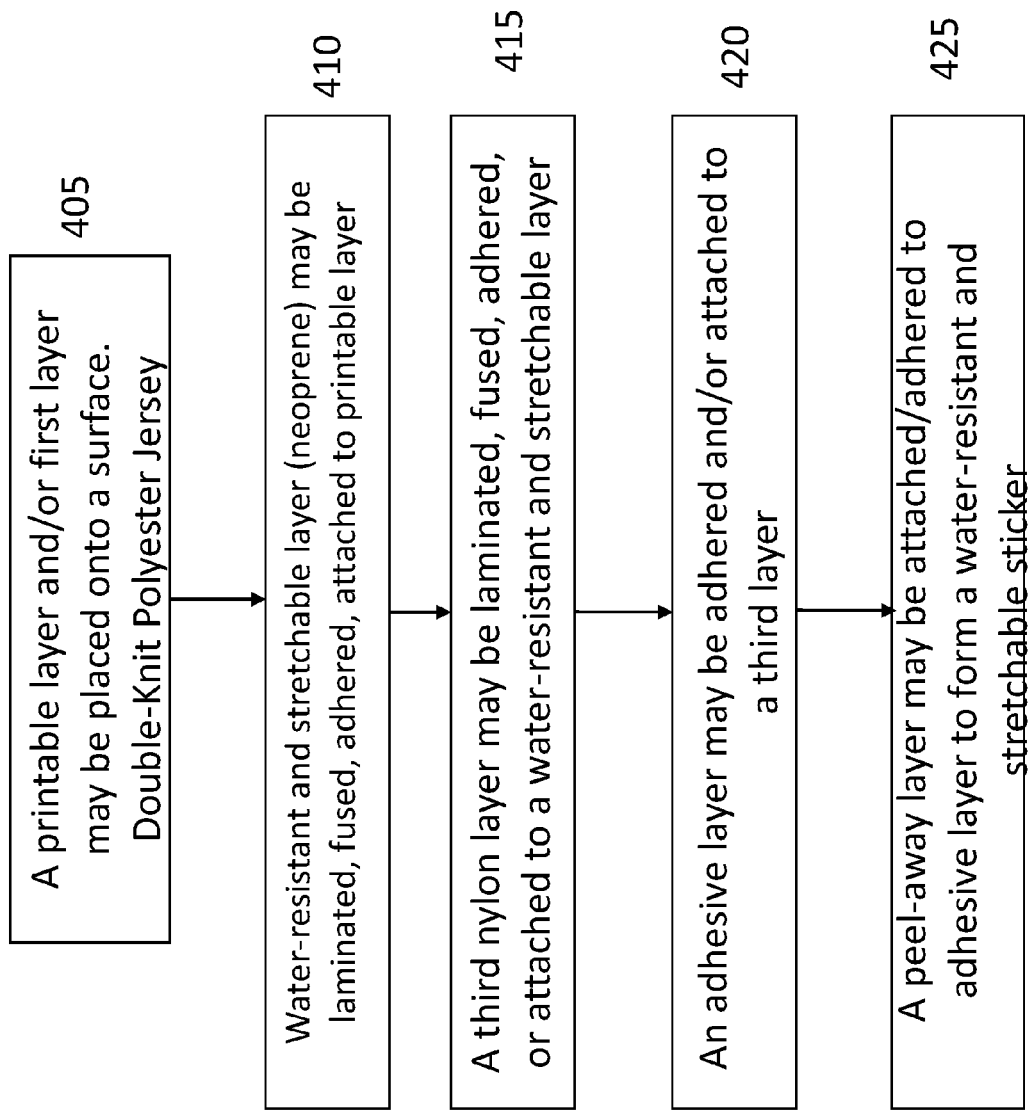

WATER RESISTANT AND STRETCHABLE STICKER

RELATED APPLICATIONS

This application claims priority to provisional application Ser. No. 62/110,895, filed Feb. 2, 2015.

BACKGROUND

1. Field

The present invention relates generally to a water-resistant and stretchable (e.g., wetsuit or watersuit accessory) apparatus, method of application and method of making. The present invention is directed to a bendable (or flexible) water-resilient, and/or water-resistant sticker device that may be applied onto wetsuits, jackets, and/or other neoprene wearable water suits (or similar fabrics). The sticker device allows an individual to express themselves easily on a wetsuit.

2. Information

Self-expression is one of the most valuable freedoms and individual can enjoy. Self-expression is meant to reveal the personality of an individual, and can imprint a lasting impact on others that encounter the individual. While self-expression has recently expanded to numerous different countries, races, ages, and other backgrounds and professions, there are many untouched or underserved groups of people or markets where self-expression is a bit more limited. In some situations, self-expression may not be allowed at all because of censorship (whether real or perceived), the ability to freely form a sense of expression through all avenues for an individual allows each person to embrace their interests and uniqueness in every way. Water-resistant sportswear (wetsuits, lifejackets, or other Neoprene-based water suits) are utilized in water environments such as lakes, swimming pools, oceans (whether above-the surface or under water). Users of water-resistant sportswear do not have many options for self-expression for their wetsuits. In addition, even if a wetsuit has a different design than other wet suits, there still exists a need to allow for more self-expressions by allowing users to place or add designs to their water-resistant sportswear.

BRIEF DESCRIPTION OF DRAWINGS

Claimed subject matter is particularly pointed out and distinctly claimed in the concluding portion of the specification. However, both as to organization and/or method of operation, together with objects, features, and/or advantages thereof, it may be best understood by reference to the following detailed description if read with the accompanying drawings in which:

FIGS. 4A and 4B are flowcharts describing making of a neoprene-based sticker according to an embodiment.

Figure 1A:
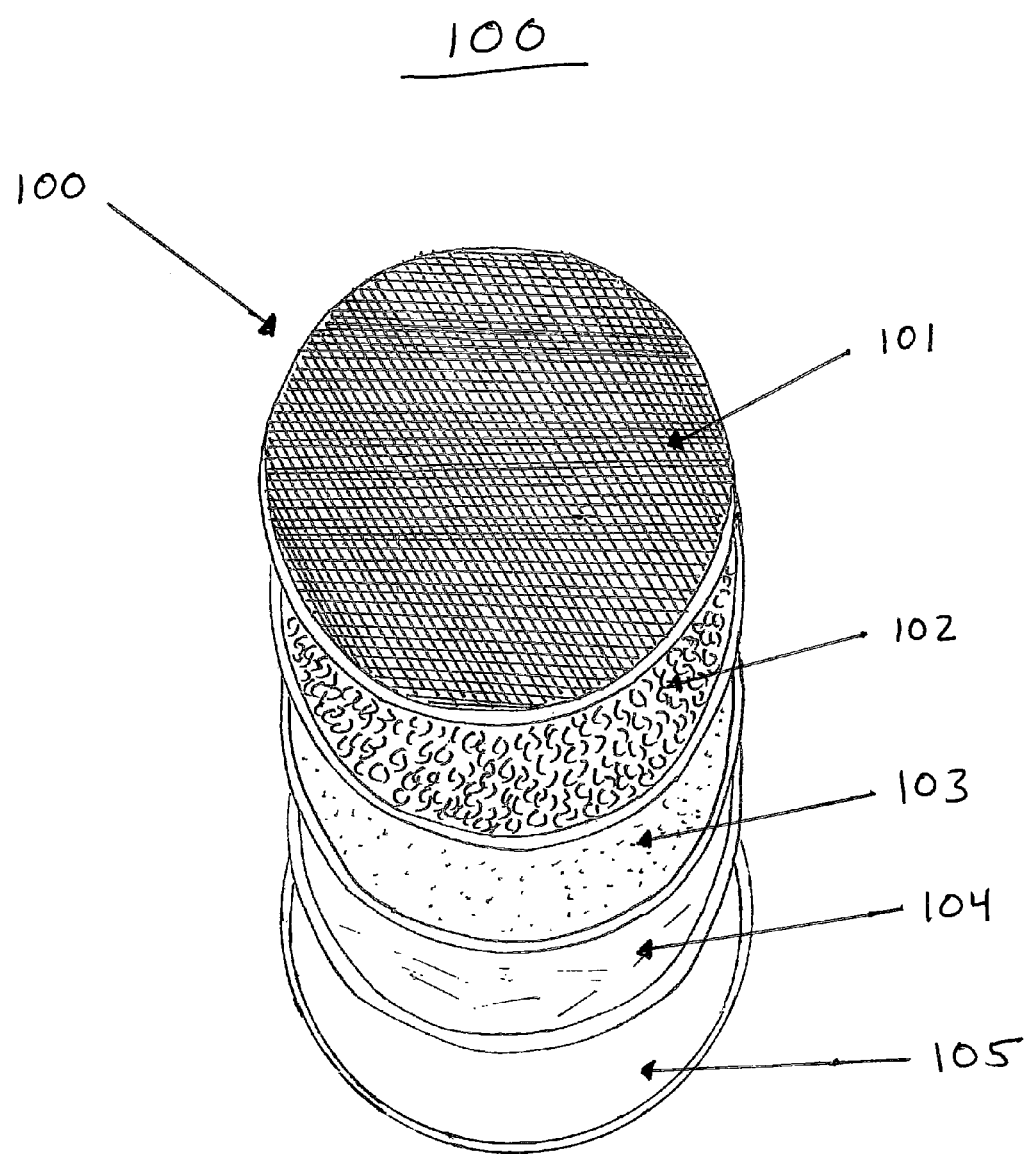
FIGS. 1A and 1B are layer block diagrams of a neoprene-based sticker according to an embodiment.

Reference is made in the following detailed description to accompanying drawings, which form a part hereof, wherein like numerals may designate like parts throughout to indicate corresponding and/or analogous components. It will be appreciated that components illustrated in the figures have not necessarily been drawn to scale, such as for simplicity and/or clarity of illustration. For example, dimensions of some components may be exaggerated relative to other components. Further, it is to be understood that other embodiments may be utilized. Furthermore, structural and/or other changes may be made without departing from claimed subject matter. It should also be noted that directions and/or references, for example, up, down, top, bottom, and so on, may be used to facilitate discussion of drawings and/or are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope, for example. In general, of course, these and other issues vary with context. Therefore, particular context of description and/or usage provides helpful guidance regarding inferences to be drawn.

Likewise, in this context, the terms "coupled", "connected," and/or similar terms are used generically. It should be understood that these terms are not intended as synonyms. In most contexts, "connected" is used generically to indicate that two or more components, for example, are in direct physical, including electrical, contact. In this context, "connect(s)" or "connection" refers to a logical or virtual association between two users or members of a social network, which is defined infra. "Connect" or "connection" also refers to direct and/or indirect communication between users or members of a social network. In this context, "coupled" is used generically to mean that two or more components are potentially in direct physical, including electrical, contact; however, "coupled" is also used generically to also mean that two or more components are not necessarily in direct contact, but nonetheless are able to co-operate and/or interact. The term coupled is also understood generically to mean indirectly connected, for example, in an appropriate context.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more illustrative examples; however, again, particular context of description and/or usage provides helpful guidance regarding inferences to be drawn.

In an embodiment, water-resistant garments refer to swim suits, board shorts, wet-suits, water-suits, skirts, jackets, undergarments, shirts, tops, blouses, boots and other neoprene-based garments. In addition, in an embodiment, water-resistant devices may be boats, jet skis, water skis, canoes, kayaks, surfboard, paddleboards, oars, water sporting devices, or other in-water devices.

In an embodiment, stickers may refer to material that is applied to a garment for adhesion or connection to a garment. In this application, terms such stickers, labels, or decals may be utilized interchangeably.

In an embodiment, water-resistant, stretchable garments may be designed to fit tightly to or around a person wearing a water-resistant, stretchable garment or sportswear. For example, water-resistant, stretchable garments or sportswear like neoprene may fit snugly around in individual wearing during use. In an embodiment, for example, wet suits may fit tightly to and/or around a person. In an embodiment, for example, users may take a wetsuit on and off, resulting in movement of a water-resistant, stretchable garment (e.g., bending arms, legs, elbows, knees of a user, and/or twisting of a torso, arms, legs, elbows, and/or knees of a user results in movement, stretching, and/or elongation of a water-resistant, stretchable garment). In an embodiment, illustratively, movement of a user may cause extreme stress on water-resistant, stretchable garments, which results in pulling, stretching, and/or elongating of the garment material in many different directions. In an embodiment, a water-resistant, stretchable garment may be a neoprene-based garment. In other words, a neoprene-based garment may be made solely of neoprene or may have other fabric or materials in addition to including neoprene.

In an embodiment, neoprene may be made of a plurality of polychloroprene rubber chips. In an embodiment, polychloroprene rubber chips may be mixed and melted together with foaming agents and/or black carbon pigments. In an embodiment, a mixture may be baked in an oven and chips may expand and create a block of material. Continuing with this illustrative embodiment, a block of material may be referred to as a sponge block. In an embodiment, a sponge block may be cured and a cured block may be sliced up into sheets. In an embodiment, slicing of a cured block may be made horizontally. In an illustrative embodiment, for example, neoprene blocks may be sliced or cut to a desired thickness. In an embodiment, soft sheets of neoprene of varying thickness may be laminated with a high stretch nylon and/or a polyester knit. In an embodiment, a high stretch nylon and/or a polyester jersey knit may give a neoprene sheet additional strength. In embodiments, sheets of neoprene may be laminated or have melted thereon, a nylon knit fabric. In embodiments, a nylon material may include 100% nylon. In embodiments, a nylon-based material may include nylon and other materials. In embodiments, a polyester material may include 100% polyester, and in embodiments, a polyester-based material may include polyester and other materials. In embodiments, a neoprene-layer and/or garment may comprise 100% neoprene and in embodiments, a neoprene-based garment may include neoprene and other materials. In embodiments, a water resistant and stretchable sticker, as described herein, including neoprene-based layers and/or neoprene, can be applied to neoprene-based garments and/or neoprene garments.

In an embodiment, a limestone neoprene may have a high micro-cell structure. In an embodiment, oil-based neoprene may have a lower micro-cell structure. In an embodiment, neoprene may be comprised of independent closed cells (e.g., bubbles) that are packed together at an extremely high density. For example, oil-based neoprene has a cell penetration of 60 to 70% whereas limestone neoprene has a 94% cell penetration. This results in limestone neoprene having a lot more air bubbles inside rubber (or neoprene) than other types of neoprene (over 30% in some embodiments). Thus, limestone-based neoprene may be less dense than oil-based neoprene. In an embodiment, because of limestone-based neoprene's micro-cell structure, limestone-based neoprene may provide several serious distinct advantages to the functionality of water-resistant garments (e.g., wetsuits) as compared to oil-based neoprene. In an embodiment, limestone-based neoprene may more impermeable, lighter in weight, warmer, more durable, and/or more stretchable than prior neoprene blocks (e.g., including oil-based neoprene blocks). In embodiments, water-resistant and stretchable stickers may include a limestone neoprene layer and/or a limestone neoprene-based layer. In embodiments, water-resistant and stretchable stickers may include an oil-based neoprene layer and/or an oil-based neoprene-based layer.

In an embodiment, neoprene fabric or material may stretch up to 200% from its original dimensions. In embodiments, neoprene fabric or material may stretch up to 300% from its original dimensions. In embodiments, neoprene and/or neoprene-based material may stretch from between 450% to 600% from its original dimensions. In embodiments, neoprene fabric or material may stretch up to 480% to 500% as compared to human skin.

In order for a sticker to adhere and/or attach to a water-resistant and stretchable garment, a sticker may have to handle bending and stress forces. Examples of stress experienced by a water-resistant and stretchable garment may be use in an environment (e.g., scuba-diving, snorkeling, surfing, boat-riding, etc.) and/or a user putting on a water-resistant and stretchable garment. In embodiments, a water resistant and stretchable garment may be a neoprene-based sticker. In embodiments, a water-resistant and/or stretchable sticker may be pulled and/or stretched in a plurality of directions (e.g., up, down, back, forward, left and/or right). In an embodiment, for example, a water-resistant and stretchable sticker may utilize neoprene to be able to handle being pulled, elongated, and/or stretched in a plurality of directions. In embodiments, a sticker may comprise a neoprene layer and/or a neoprene-based layer. In other embodiments, a sticker may comprise a plurality of neoprene layers. In embodiments, a water resistant and stretchable sticker may include an adhesive (or adhesive layer) and a peel-away layer to adhesion with a water-resistant and stretchable garment. Although descriptions herein identify layers (e.g., neoprene layers, double-knit polyester layers, nylon layers, adhesive layers, peel-away layers), these layers may be comprised of a plurality of sublayers.

Vinyl-based stickers are not designed to stretch. Vinyl-based stickers may bend or flex, but will not stretch. If vinyl-based stickers are stretched, a vinyl-based sticker may distort and/or warp. Alternatively, or in addition to, an image and/or pattern on a vinyl-based sticker may crack, distort and/or warp, which may decrease image quality of the vinyl-based sticker. This may or may not be in addition to body and/or substrate of a vinyl-based sticker distorting and/or warping. In other words, vinyl-based stickers may not have resiliency to a stretching and/or elongating motion and/or in medium to high stress environments where the stickers are exposed to weather elements and movement of a sticker. In embodiments, vinyl-based stickers may rip or tear if a vinyl-based sticker is pulled, stretched, and/or elongated more than 20% from original dimensions.

Vinyl-based stickers have significantly less flexibility and resiliency of neoprene-based stickers, which may be pulled, stretched, and/or elongated up to 200 or 300% from original dimensions in some embodiments. Neoprene-based stickers may refer to stickers including one or more neoprene and/or neoprene-based layers. In other embodiments, neoprene-based stickers may be pulled, stretched, or elongated up to 300%-450% from original dimensions and in embodiments, neoprene-based stickers may be pulled, stretched, or elongated from 480 to 600% from original dimensions.

Another additional issue for vinyl-based stickers, in embodiments where vinyl-based stickers are adhered and/or attached to a stretchable material, the vinyl-based sticker may break loose from a stretchable material when the stretchable material is stretched, pulled, and/or elongated. In embodiments, a vinyl-based sticker may detach from a stretchable material (e.g., such as a neoprene-based garment and/or neoprene sportswear) during stretching movements which cause a stretchable material to stretch more than 120% to 150% from its original dimensions.

In addition, another weakness of vinyl-based stickers is that vinyl-based stickers may be thin with a solid non-porous surface. In embodiments, an image, lettering, and/or a pattern on a flat surface of a vinyl-based sticker may fracture and/or crack during elongation, stretching or movement of a vinyl-based sticker. In embodiments, a vinyl-based sticker may fracture and/or crack at low and/or infrequent elongations. In an embodiment, for example, a vinyl sticker may have a thickness of approximately 3 mils, which corresponds to 0.0762 millimeters. This may result in a sticker with a shallow depth. In an embodiment, ink utilized to print an image, lettering or pattern may only penetrate a top layer of a vinyl sticker. This may result in a lower quality image printed utilizing the ink on a vinyl-based sticker.

In embodiments, a water-resistant and stretchable sticker may comprise a plurality of layers. In embodiments, a water-resistant and stretchable sticker may comprise at least two layers or at least five layers. In embodiments, a first layer may be a polyester layer. This layer may be stretchable. In embodiments, a first layer may be a top layer. In an embodiment, a first layer may comprise a double-knit polyester jersey material. In embodiments, for example, a double-knit polyester jersey material may be 100% polyester. In embodiments, a double-knit polyester jersey material may include other materials and/or fabrics. Continuing with this illustrative embodiment, screen printing may have better quality and image depth on a polyester jersey material. Colors may be richer and more accurately represented. In embodiments, for example, a double knit polyester layer may allow material to expand out in all directions 3× more and return back to an original shape as compared with a single knit layer. In embodiments, a density of a double-knit polyester layer may be twice that of single knit polyester layer, and therefore patterns/images imprinted on the double-knit polyester material create a sharper and more vibrant colored image. In an embodiment, a first layer may have a thickness of a 0 to 0.5 millimeters or have a thickness from 0.5 millimeters to 1.0 millimeters. In an embodiment, a first layer may be a printable layer. In an embodiment, for example, a water-resistant and stretchable sticker may have a printable or first layer comprised of a 0.5 millimeter thick stretchable polyester double-knit jersey material onto which an image, pattern or lettering may be printed.

In embodiments, a first layer may be a nylon layer. In an embodiment where a first layer is a nylon layer, a first layer may have a thickness ranging from 0 to 1.0 millimeters. In embodiments, nylon layers may have better image reproduction capabilities as compared to vinyl-based stickers having a vinyl layer.

In embodiments, a second layer of a water resistant and stretchable sticker may be a neoprene-based or a neoprene layer. In an embodiment, a water-resistant and stretchable sticker may have a neoprene layer having a 1 millimeter or greater thickness. For example, a neoprene layer may have a range of 0.5 millimeter to 1.5 millimeter in thickness. In an embodiment, for example, a neoprene-based and/or neoprene layer may have a thickness of 1.0 millimeter. In an embodiment, a first layer may be fused and/or melted onto a second layer. In other words, in embodiments, a double-knit polyester jersey layer may be fused and/or melted onto a neoprene-based and/or neoprene layer. In an embodiment, a first layer may be adhered and/or attached onto a second layer.

In embodiments, a first and second layer of a water-resistant and stretchable sticker (e.g., a sticker having a neoprene or neoprene-based layer) may have a combined thickness of 1.5 millimeter or thicker. In an embodiment, a third layer may be a nylon layer. In embodiments, a nylon layer may have a thickness range of 0.01 to 1.0 millimeters. In an embodiment, for example, a nylon or third layer may have a thickness of 0.5 millimeters. In embodiments, a third or nylon layer may be fused, melted, adhered, and/or attached to a second (e.g., neoprene-based or neoprene) layer. In embodiments, nylon may provide additional strength for a neoprene-based layer and improve a neoprene-based layer's resiliency. In embodiments, a water-resistant and stretchable sticker may not have a third layer. Continuing with this illustrative embodiment, a water-resistant and stretchable sticker may not have a nylon layer.

In an embodiment, a fourth layer may be an adhesive layer. In an embodiment, a fourth layer may be attached and/or adhered to a third layer. In embodiments, for example, an adhesive layer may be adhered or attached to a nylon-based layer. In embodiments where a nylon layer is not included in a water-resistant and stretchable sticker, an adhesive layer may be adhered and/or attached to a neoprene and/or neoprene-based layer. In an embodiment, an adhesive layer may have a thickness of 0.13 millimeters. In an embodiment, an adhesive layer may have a thickness range between 0.01 to 0.30 millimeters. In embodiments, an adhesive layer may be a pressure sensitive adhesive material. In embodiments, an adhesive layer may be a modified acrylic. In embodiments, an adhesive layer may have a heavy adhesive mass and provide improved bonding performance, tack and adhesion. In embodiments, an adhesive layer may have a loop tack of 2 mil PET/20° minimum.

In embodiments, a fifth layer may be a peel-away layer. In embodiments, a peel-away layer may be attached to an adhesive layer. In embodiments, a peel-away layer may be removed, exposing an adhesive layer, and this may allow a water-resistant and stretchable sticker to be attached and/or adhered to a water-resistant and stretchable garment (e.g., a neoprene wet suit or top). In an embodiment, a peel-away layer may have a thickness of 0.12 millimeters. In embodiments, a peel-away layer may have a thickness of 0.01 to 0.30 millimeters. In embodiments, a water-resistant and stretchable sticker (e.g., a neoprene-based sticker) may be attached to one of many locations on a water-resistant and stretchable garment. In embodiments, a peel-away layer may be a densified kraft release liner.

In an embodiment, an apparatus may apply a screen print to a first layer of a water-resistant and stretchable sticker. In an embodiment, a screen print may be a high definition (HD) print. In embodiments, ink from a screen print may saturate a first layer (e.g., a top stretchable polyester jersey layer) and/or a second layer (e.g., a Neoprene-based layer). In embodiments, a second layer may be a porous material and may absorb ink from a design or pattern. In embodiments, a neoprene-based layer may be porous and allow absorption of ink from a design or pattern. In embodiments, a thickness of a first layer and a second layer of a water-resistant and stretchable sticker (e.g., a sticker including a neoprene or neoprene-based layer) may be greater than a thickness of a surface of a vinyl sticker, and thus, a water-resistant and stretchable sticker may absorb ink creating a pattern and/or design at a much greater depth and/or image quality than a vinyl sticker. In addition, if a first layer of a water-resistant and stretchable sticker may be a nylon-based layer, improved image quality and/or depth of a screen print may be achieved as compared to a vinyl-based sticker.

As discussed above, a vinyl sticker may have a printable layer of approximately 0.0762 millimeters. In an embodiment, for example, where a first layer (polyester double-knit jersey layer) has a thickness of 0.5 millimeters and a second layer (neoprene-based layer) has a thickness of 1.0 millimeters, a combined thickness of a first layer and a second layer may be 1.5 millimeters. In an embodiment, a water-resistant and stretchable sticker may have a depth approximately 22 times (1.5 millimeters as compared to 0.0762 millimeters) more than a vinyl-based sticker. In embodiments of water-resistant and stretchable stickers where a first layer is a nylon layer and a second layer is a neoprene-based layer, a thickness of a first layer and a second layer may be approximately 1.5 millimeters. This embodiment also has a better depth (and therefore image reproduction capabilities) than a vinyl sticker. In an embodiment, this greater saturation and/or depth of a screen print may allow the printed image and/or pattern on a water-resistant sticker to retain sharpness as a water-resistant sticker is elongated, stretched and pulled during application and use of a water-resistant garment (e.g., a neoprene garment). Such use may be performing motions in an ocean, a lake or other body of water while, for example, swimming, diving, snorkeling, scuba diving, jet-skiing, wakeboarding, and/or parasailing (or other activities), as well as returning to a static state when a user is at rest. This is an improvement in sticker quality. In embodiments, neoprene-based stickers may be adhered to a neoprene-based garment in a stronger fashion than vinyl stickers. In embodiments, a neoprene-based garment is skin tight and neoprene-based stickers (for example, water resistant and stretchable stickers with neoprene or neoprene-based layers) may easily stretch, elongate or move as a person moves.

In embodiments, a water-resistant and stretchable sticker may have a plurality of layers. In an embodiment, for example, a water-resistant and stretchable sticker may have five layers. In an embodiment, a first layer may be a top layer. Continuing with this illustrative embodiment, a first layer may be a polyester-based layer. Illustratively, in embodiments, a first layer may be a 100% double-knit polyester jersey fabric. In embodiments, a double-knit polyester jersey fabric may be better for printing and/or absorbing ink from a screen print (e.g., a printed pattern, letter and/or image). In an embodiment, a first layer may be 0.5 millimeters thick. In embodiments, a first layer may range in thickness from 0.01 millimeters thick to 1.0 millimeters in thickness. In an embodiment, a first layer may be comprised of a plurality of double-knit polyester jersey fabric layers attached or adhered to each other.

In embodiments, a second layer may be a neoprene-based material or fabric. In an embodiment, a second layer may be 1.0 millimeters thick. In embodiments, a first layer may range in thickness from 0.5 millimeters thick to 1.5 millimeters thick. In embodiments, a second layer may be fused and/or melted onto a first layer. In an embodiment, a neoprene layer may be fused and/or melted onto a double-knit polyester jersey fabric. In an embodiment, a second layer may be comprised of a plurality of neoprene sublayers attached or adhered to one another.

In embodiments, a third layer may be a nylon fabric layer. In an embodiment, a third layer may be 0.5 millimeters thick. In embodiments, a third layer may range in thickness from 0.01 millimeters thick to 1.0 millimeters thick. In embodiments, a third layer may be melted and/or fused to a second layer. In an embodiment, a nylon or nylon fabric layer may provide strength to a second layer (e.g., a neoprene layer).

In embodiments, a fourth layer may be an adhesive layer. In an embodiment, a fourth layer may be attached or adhered to a third layer (e.g., a nylon fabric layer). In an embodiment, an adhesive layer may have a thickness of 0.13 millimeters. In an embodiment, an adhesive layer may have a thickness of between 0.01 to 0.30 millimeters.

In embodiments, a fifth layer may be attached to a fourth layer. In an embodiment, a fifth layer may be a peel-away layer, which may be attached to a fourth layer, (e.g., an adhesive layer). In an embodiment, a peel-away layer may be removed, exposing an adhesive layer, and this may allow a water-resistant and stretchable sticker to be attached and/or adhered to a water-resistant and stretchable garment (e.g., a neoprene wet suit or top). In an embodiment, a peel-away layer may have a thickness of 0.12 millimeters. In embodiments, a peel-away layer may have a thickness of 0.01 to 0.30 millimeters. In an embodiment, a water-resistant and stretchable sticker (e.g. a neoprene-based sticker) may be attached to one of many locations on a water-resistant and stretchable garment.

In embodiments, a water-resistant garment (e.g., a neoprene-based garment) may have a stress point between 150% to 200% and still be able to return to its original form. Illustratively, if a water-resistant garment goes above a stress point, a garment may not return to its original form. In embodiments, a water-resistant sticker (e.g. a neoprene-based) sticker may be able to retain its shape and not rip, tear and/or elongate even if the garment stretches, elongates or deforms between 150% to 200% from its original form. In an embodiment, further, a sticker image and/or pattern may also remain sharp after a neoprene-based garment stretches, elongates, or deforms from 150% to 200% from its original shape and then returns to its static state or shape. In embodiments, a water-resistant garment (e.g., a neoprene-based garment) may have a stress point between 200%-600% and still be able to return to its original form. In embodiments, a water-resistant sticker (e.g., a neoprene-based sticker) adhered and/or attached to a water-resistant and stretchable garment may be able to retain its shape and not rip, tear, and/or elongate even if the water-resistant garment stretches, elongates or deforms between 200% to 600% from its original form and/or shape.

In an embodiment, further, a sticker image and/or pattern may also remain sharp after a neoprene-based garment stretches, elongates, or deforms from 480% to 600% from its original shape and then returns to its static state or shape. In embodiments, a sticker image and/or pattern may also remain sharp and not rip or tear when a water-resistant and stretchable sticker elongates or deforms from 100 to 200%. Continuing with this illustrative embodiment, a water-resistant and stretchable sticker may also not de-attach or fall off a water-resistant and stretchable garment.

U.S. Pat. No. 5,943,697 illustrates a vinyl sticker. The vinyl sticker is may be applied to go on garments such as kids clothing, such as skirts, jackets, vests, knapsacks and/or rain boots. These garments are not designed to be underwater or in the ocean enduring the stresses or stretching of vinyl stickers. The stickers in U.S. Pat. No. 5,943,697 appear to be removable and easily reattached. In contrast, a neoprene-based sticker, such as described herein in this application and that is water-resistant and stretchable, is designed for a one time application to areas of a wetsuit. Vinyl stickers are not designed to adhere to water-resistant garments that are made specifically for ocean and/or swimming pools, and other water environments. In addition, a vinyl sticker (e.g., of a flower image) will not stretch without distorting an image. In addition, a vinyl sticker may not have a water resistant adhesive glue or a peel-away layer.

U.S. Pat. No. 5,942,065 illustrates manufacturing a skin decal that has more realness than prior skin decals. The sticker may be temporarily applied to the skin. This sticker is different in structure as compared to a structure of a water resistant and stretchable sticker (e.g., a sticker having a neoprene-based layer and/or a neoprene layer), such as described herein. In addition, iron-on labels are different than neoprene-based stickers because neoprene materials may not be ironed (e.g., neoprene may melt at iron temperatures). Iron-on labels may be able to last through washer and dryer applications, but iron-on labels or decals do not have resiliency. In addition, iron-on labels do not have a water resilient adhesive and/or a peel away layer.

In embodiments, a water-resistant and stretchable sticker (e.g., a sticker) may be attached and/or adhered to may water-resistant and stretchable garments (e.g., swim suits, board shorts, wet-suits, water-suits, skirts, jackets, undergarments, shirts, tops, blouses, boots and other neoprene-based garments). In addition, in embodiments, a water-resistant, resilient and stretchable sticker (a sticker having a neoprene-based layer and/or a neoprene layer) may be attached or adhered to knapsacks, backpacks, purses, handbags or other similar carriers that are subjected to medium to high stresses and maintain its shape and/or image quality. In embodiments, a water-resistant, resilient and stretchable sticker may be attached or adhered to water-resistant devices such as boats, jet skis, water skis, canoes, kayaks, surfboard, paddleboards, oars, water sporting devices, or other in-water devices, which are subject to environmental conditions and high stress situations during operation.

FIG. 1A illustrates a water resistant and/or stretchable sticker according to an embodiment. In an embodiment, such as one illustrated in FIG. 1A, a water-resistant and stretchable sticker 100 may comprise five layers, although fewer layers or more layers may be utilized. In an embodiment, a first layer 101 may be a polyester layer. In an embodiment, a first layer may be a double-knit polyester jersey layer. In embodiments, a first layer may be a printable layer onto which a screen print may be printed. In embodiments, double-knit polyester jersey layers may absorb more colors or patterns, as compared to a vinyl layer. In an embodiment, a second layer 102 be a neoprene layer or a neoprene-based layer. In an embodiment, a second layer 102 may be fused and/or laminated onto a first layer 101. In embodiments, a double-knit polyester jersey layer and a neoprene layer may absorb more ink and produce better image quality than a vinyl layer.

In an embodiment, a third layer 103 may be a nylon layer. In an embodiment, a third layer 103 (e.g., a nylon layer) may be fused, melted, adhered and/or attached to a second layer 102 (e.g., a neoprene layer). In embodiments, a nylon layer may strengthen resiliency and quality of a neoprene or neoprene-based layer.

In embodiment, a fourth layer 104 may be an adhesive layer. An adhesive layer 104 may comprise an adhesive. In embodiments, an adhesive layer 104 may be adhered and/or attached to a third layer (e.g., a nylon or nylon fabric layer) 103. In an embodiment, an adhesive layer may be between 0 and 0.30 millimeters in width and a release line may be between 0 and 0.30 millimeters in width.

In an embodiment, a fifth layer 105 may be a peel-away layer. In embodiments, a peel-away layer may initially be attached to a fourth layer 104 (adhesive layer) but may be able to be detached by removing the peel-away layer. In embodiments, a peel-away layer 105 may be a liner or a release liner, such as an 80# Densified Kraft Liner. Thus, in an embodiment, a peel-away layer 105 may be between 0.01 and 0.30 millimeters in thickness or width. In an embodiment, Avery-Dennison product FT-1158-TDS may comprise both an adhesive layer 104 and a peel-away layer 105 as an adhesive layer. In an embodiment, a fifth layer 105 (or peel-away layer) may be detached from an adhesive layer 105 and a sticker surface (not the adhesive layer 104) may be applied or attached to a water-resistant and stretchable garment. In embodiments, a fourth layer 104 (e.g., adhesive layer) and a fifth layer 105 may come as a one-piece adhesive with a peel-away liner. In embodiments, a peel-away liner (and/or an adhesive layer) may be on a 500 foot roll. In embodiments, the combined adhesive with a peel-away liner may be applied to a back of a third layer (e.g., nylon layer), where it transfers an adhesive to a nylon layer, and stays on a nylon layer when a peel-away liner is removed.

Figure 1B:
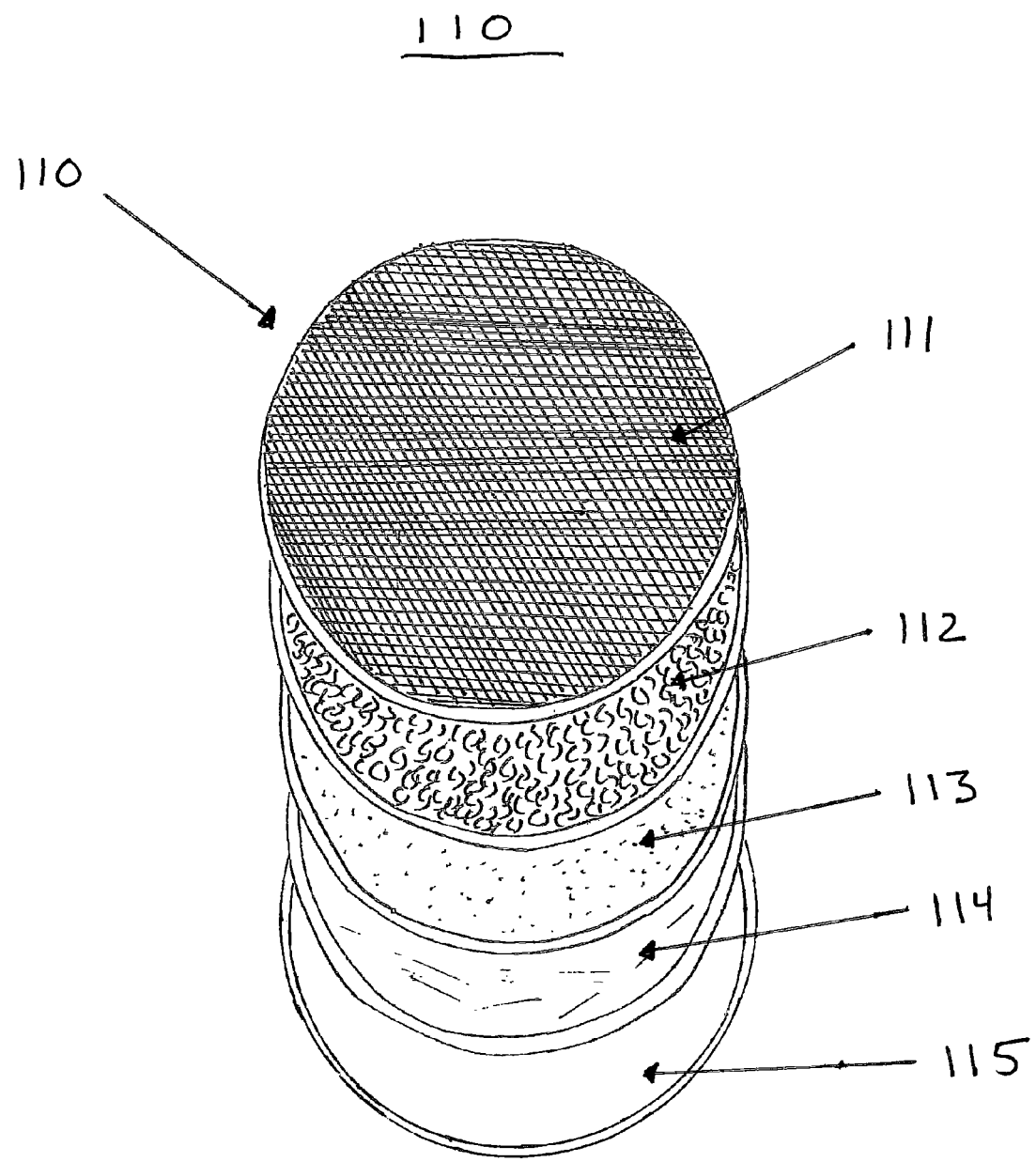

FIG. 1B illustrates a five-layer water-resistant and stretchable sticker according to an embodiment. In embodiments, such as one illustrated in FIG. 1B, a water-resistant and stretchable sticker 110 may comprise five layers, although fewer layers or more layers may be utilized. For each layer identified herein, several sheets and/or sublayers of a same or similar material may be utilized to constitute a defined layer (e.g., first layer and/or third layer). In an embodiment, a first layer 111 may be a nylon layer. In embodiments, a first layer 111 may be a printable layer having lettering, patterns and/or images printed thereon. In embodiments, a first layer may be comprised of 100% nylon fabric or layer. Such a fabric or layer may absorb more colors or patterns, as compared to absorption of a vinyl layer or quality of images, lettering, or numbers printed thereon. In an embodiment, a second layer 112 be a neoprene layer and/or a neoprene-based layer. In embodiments, a second layer 112 may be fused, laminated, attached and/or adhered onto a first layer 111.

In embodiments, a third layer 113 may be a nylon knit or fabric layer. In embodiments, a nylon knit layer 113 may provide additional strength for a neoprene layer 112 (e.g., a second layer 112). A third layer 113 may be fused, laminated, attached and/or adhered onto a second layer 112.

In embodiments, a fourth layer 114 may be an adhesive layer. Continuing with this illustrative embodiment, an adhesive layer 114 (or fourth layer) may be adhered and/or attached to a third layer 113. In embodiments, a sheet or protective material may be removed from a fourth (or adhesive) layer 114 before an adhesive layer 114 is attached or adhered to a third layer (e.g., a nylon layer 113).

In embodiments, a fifth layer 115 may be a peel-away layer. In an embodiment, an adhesive material and a peel-away layer may be an Avery-Dennison product FT-1158-TDS. In embodiments, a peel-away layer may be 80# Densified Kraft Liner. In embodiments, a fourth layer 114 may comprise an adhesive material (e.g., an acrylic material) and a fifth layer 115 may comprise a liner on a back of the adhesive material that you peel away from adhesive material before applying to a water-resistant and stretchable garment.

In embodiments, a water-resistant and flexible sticker may only include four layers. Continuing with this illustrative example, in embodiments, a first layer may be either a double-knit polyester jersey layer or a nylon layer. In embodiments, a second layer may be a neoprene-based and/or neoprene layer and may be adhered, attached, fused, and/or melted to a bottom of a first layer. In embodiments, a third layer may be an adhesive layer, which may be adhered or attached to a bottom of a neoprene-based layer. In embodiments, a fourth layer may be a peel-away layer, which may be adhered and attached to a bottom of a third layer (e.g., an adhesive layer).

Figure 2:
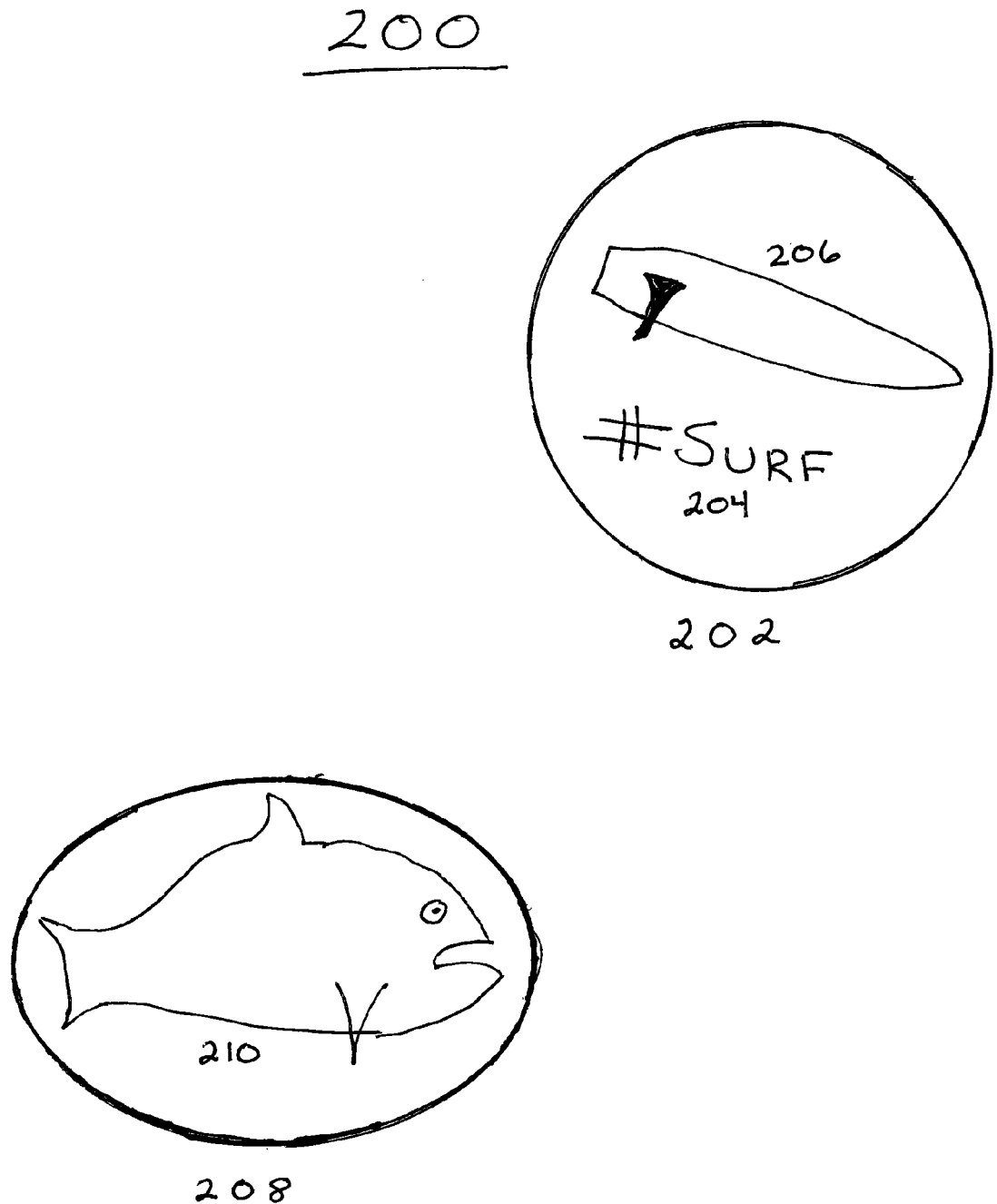
FIG. 2 are example graphic designs, patterns, and/or lettering printed on a printable layer according to an embodiment.

FIG. 2 illustrates water-resistant and stretchable stickers comprising patterns or designs according to an embodiment. Water-resistant and stretchable stickers 200 may have different designs including images, patterns, and/or lettering. In an embodiment, such as illustrated in FIG. 2, a water-resistant and stretchable sticker 202 may comprise lettering 204 and/or a design 206. Lettering and/or designs may be interchangeable and a thickness of the printable layer and neoprene layer allow for high definition and sharp designs on a water-resistant and stretchable sticker. In an embodiment, such as illustrated in FIG. 2, a sticker 208 may include a design/pattern 210 only and may not include lettering or phrases. In an embodiment, not shown, a water-resistant and stretchable sticker 208 may include lettering or phrases and no design. As illustrated in FIG. 2, a water-resistant and stretchable sticker 210 may be an oval shape, although any shape may be utilized (e.g., rectangle, circle, square, trapezoid, pentagon, etc.) if a shape conforms to or fits onto the garment.

Figure 3:
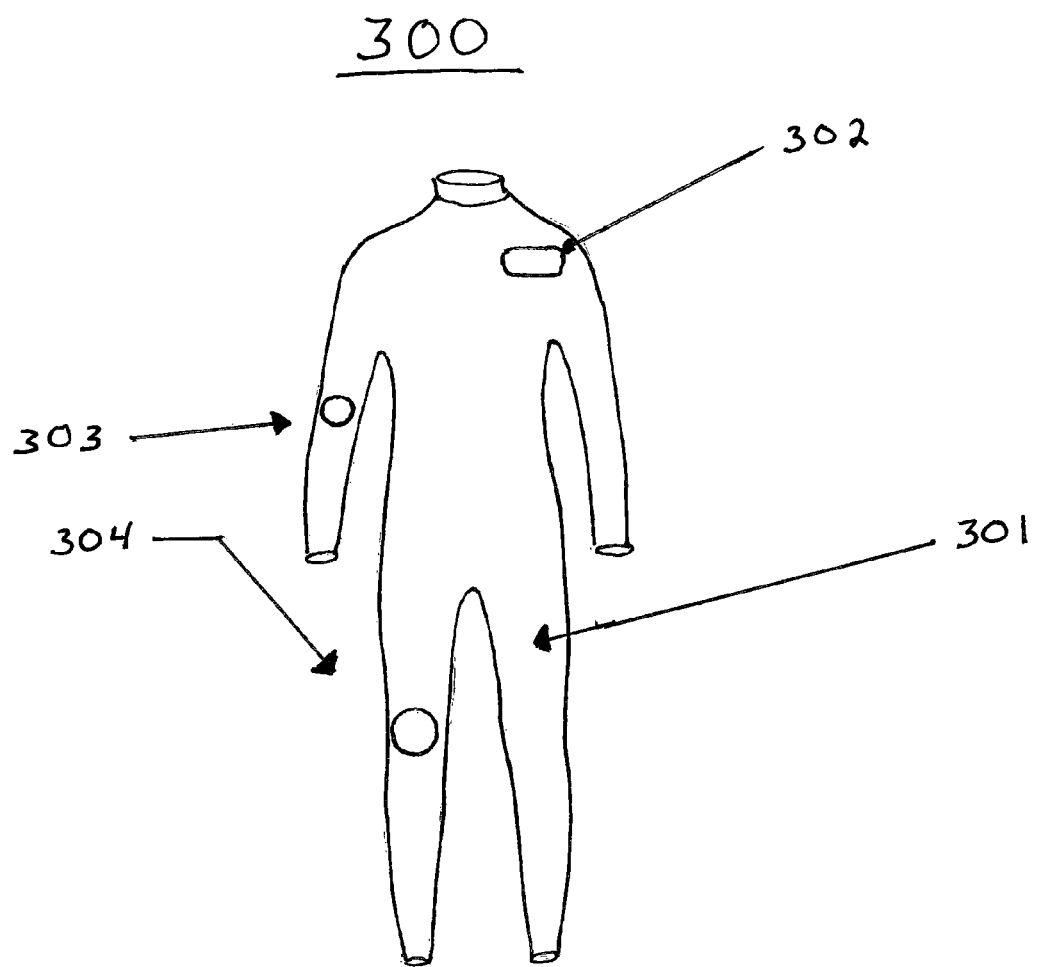
FIG. 3 is an example of water resistant sports-wear comprising a neoprene-based sticker according to an embodiment.

FIG. 3 illustrates a neoprene-based garment comprising water-resistant stickers according to an embodiment. In an embodiment, an expressible garment 300 may comprise a water-resistant garment 301 (e.g., a neoprene-based garment such as a wetsuit), a first water resistant and/or stretchable sticker 302, a second water resistant and/or stretchable sticker 303 and/or a third water resistant and/or stretchable sticker 304. As illustrated in FIG. 3, a water-resistant and stretchable sticker may have any shape or size and may be located on any portion of a garment. For example, a first water-resistant and stretchable sticker 302 is attached and/or adhered to an upper chest area of the water-resistant garment and may be oval in shape. As another illustrative example, a second water-resistant and stretchable sticker 303 may be circular in shape and may be place on an arm of a water-resistant garment. As a further illustrative example, a third water-resistant and stretchable sticker 304 may be placed on a thigh area of a water resistant garment and may be circular in shape. In an embodiment, a third water resistant and stretchable sticker 304 may be larger in size than a second water-resistant and stretchable sticker 303 although both may have a same shape. In an embodiment, multiple water-resistant and stretchable stickers may be placed on a single water-resistant and stretchable garment.

FIG. 4A is a flow diagram of an embodiment of a process to create a water-resistant, flexible and stretchable sticker. Of course, embodiments are intended to be illustrative examples rather than be limiting with respect to claimed subject matter. Likewise, for ease of explanation, an embodiment may be simplified to illustrate aspects and/or features in a manner that is intended to not obscure claimed subject matter through excessive specificity and/or unnecessary details. Embodiments in accordance with claimed subject matter may include all of, less than, or more than blocks 405-425 and 430-450. Also, the order of blocks 405-420 and 425-445 may be merely an example order.

Referring to FIG. 4A, at block 405, a printable layer and/or first layer may be placed onto a surface. In embodiments, a first layer may be a double-knit polyester jersey fabric layer. At block 410, a water-resistant, stretchable and flexible layer may be laminated, fused, adhered or attached to the printable layer. The water-resistant, stretchable and flexible layer may be a neoprene-based layer. At block 415, a third layer may be laminated, fused, adhered, or attached to a water-resistant and stretchable layer. In embodiments, a third layer may be a nylon knit layer. At block 420, an adhesive layer may be adhered and/or attached to a third layer. At block 425, a peel-away layer may be attached or adhered to an adhesive layer to form a final water-resistant, stretchable and flexible sticker.

Figure 4B:
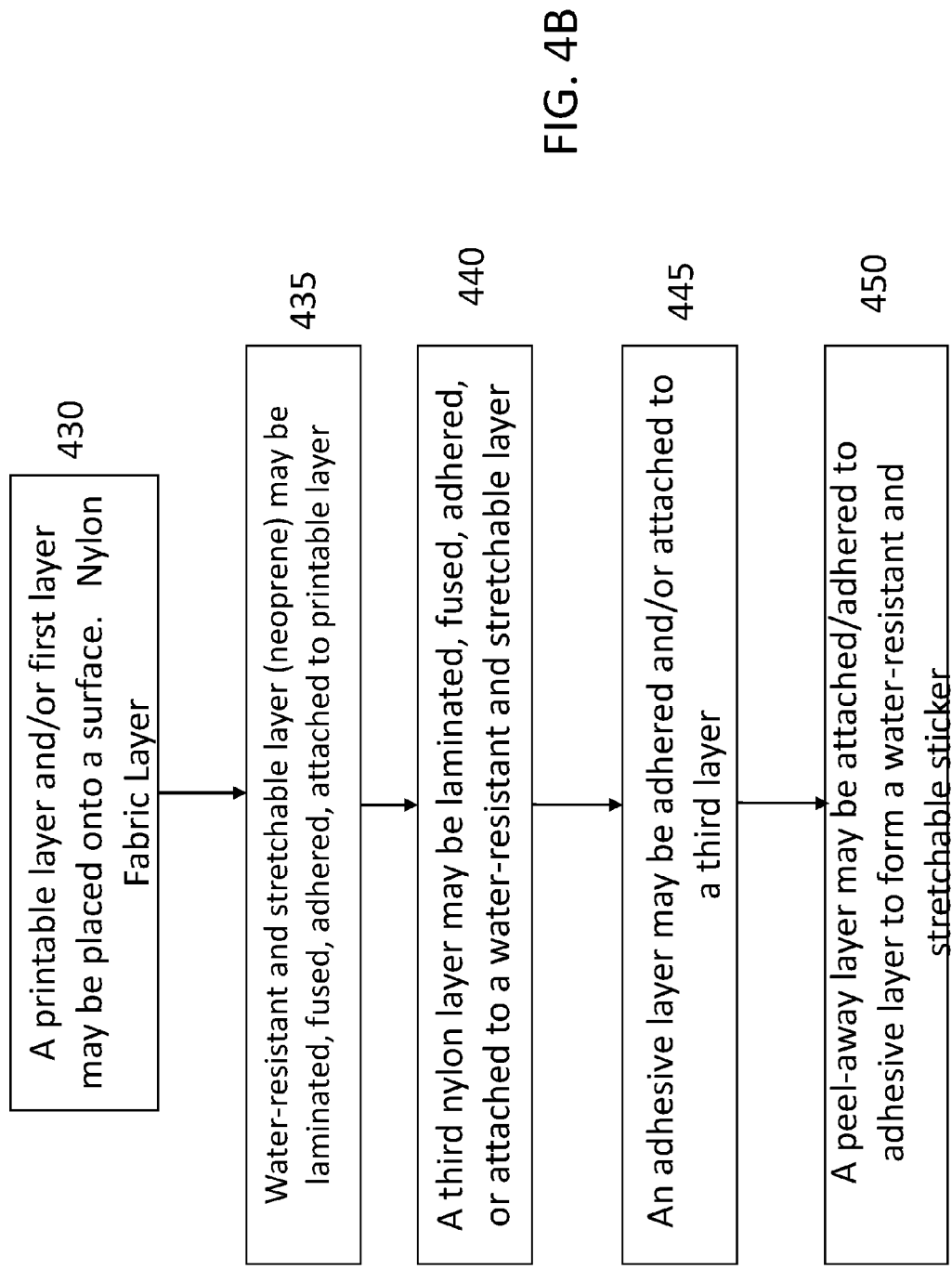

Referring to FIG. 4B, at block 430, a printable layer and/or first layer may be placed onto a surface. In embodiments, a first layer may be a nylon fabric layer. At block 435, a water-resistant, stretchable and flexible layer may be laminated, fused, adhered or attached to the printable layer. The water-resistant, stretchable and flexible layer may be a neoprene-based layer. At block 440, a third layer may be laminated, fused, adhered or attached to a second layer. In embodiments, a third layer may be a nylon knit layer. At block 445, a fourth layer (e.g., an adhesive layer) may be adhered and/or attached to a third layer (e.g., a nylon knit fabric layer). At block 450, a fifth layer (e.g., a peel-away layer) may be attached or adhered to a fourth layer (e.g., an adhesive layer) to form a final water-resistant, stretchable and flexible sticker.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A water-resistant, stretchable and adhesive decal, comprising:
   a printable layer;
   a neoprene layer, the neoprene layer being fused or melted to the printable layer; and
   a nylon fabric layer, the nylon fabric layer being fused or melted to the neoprene-based layer.

2. The water-resistant, stretchable and adhesive decal of claim 1, the printable layer comprising a nylon-based layer.

3. The water-resistant, stretchable and adhesive decal of claim 1, the printable layer comprising a polyester, double-knit jersey fabric layer.

4. The water-resistant, stretchable and adhesive decal of claim 1, further comprising an adhesive layer, the adhesive layer being adhered to the nylon fabric layer.

5. The water-resistant, stretchable and adhesive decal of claim 4, the adhesive layer being at least 0.10 millimeters in thickness.

6. The water-resistant, stretchable and adhesive decal of claim 4, further comprising the peel-away layer being adhered to the adhesive layer.

7. The water-resistant, stretchable and adhesive decal of claim 6, the peel-away layer being at least 0.10 millimeters in thickness.

8. The water-resistant, stretchable and adhesive decal of claim 1, the Neoprene layer being at least 1.0 millimeters in thickness.

9. The water-resistant, stretchable and adhesive decal of claim 1, the printable layer being at least 0.5 millimeters in thickness.

10. The water-resistant, stretchable and adhesive decal of claim 1, the nylon-fabric layer being at least 0.5 millimeters in thickness.

\* \* \* \* \*